Oct. 3, 1939.   G. C. R. KUIPER   2,174,921
BRAKE
Filed Aug. 29, 1936
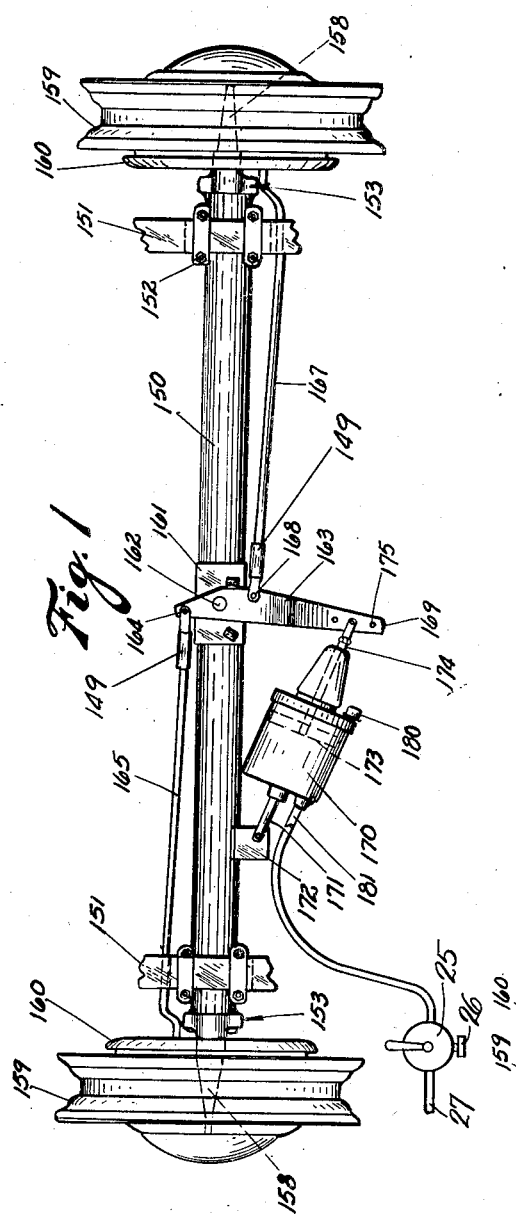
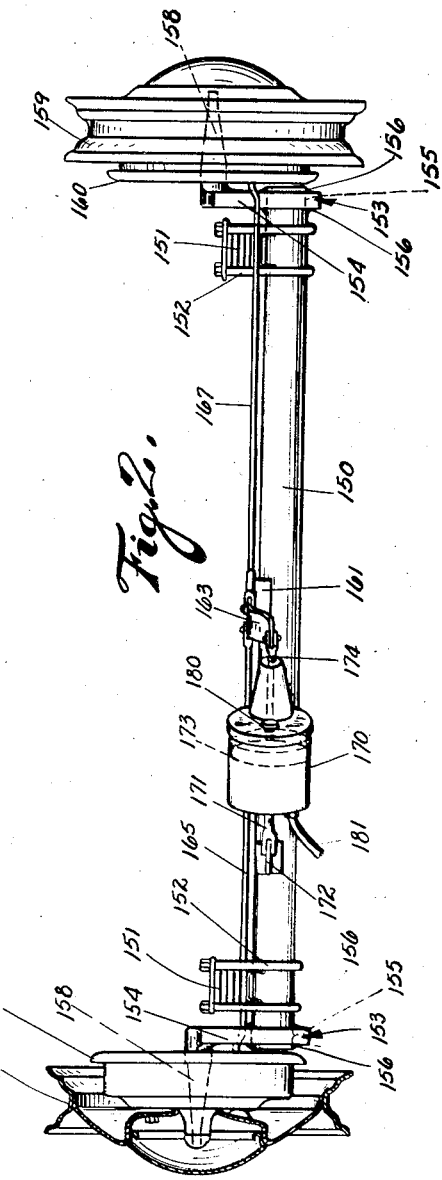
INVENTOR.
GERHARD C.R. KUIPER
BY
ATTORNEY.

Patented Oct. 3, 1939

2,174,921

UNITED STATES PATENT OFFICE 2,174,921

BRAKE

Gerhard C. R. Kuiper, Cleveland, Ohio, assignor to The Midland Steel Products Company, Cleveland, Ohio, a corporation of Ohio Application August 29, 1936, Serial No. 98,550

3 Claims. (Cl. 188—152)

This invention relates to new and useful improvements in vehicle brakes and more particularly to a brake unit for automotive trailer vehicles.

Another object of the invention is to provide a novel arrangement of a power cylinder substantially normal to and intermediate a pair of wheel brakes disposed on opposite sides of the vehicle to make for a relatively short length of power transmitting means between the power cylinder and the wheel brakes.

A further object is to provide a vehicle brake wherein the cable for operating the brake expanding means is arranged to lie substantially normal throughout its length to the brake apron.

Another object of the invention is to provide a novel arrangement of the power cylinder, power lever and power transmitting means all supported on the axle of the vehicle as a unit.

A further object of the invention is to provide a unit including an axle, wheel spindles, power cylinder, brake rods and wheel brakes, whereby the brakes may be finally adjusted prior to assembling the unit on to the vehicle.

Other objects and advantages of the invention will become apparent during the course of the following description.

In the accompanying drawing forming a part of the description and wherein like numerals are employed to designate like parts throughout the several views:

Fig. 1 is a top plan view of the invention, and
Fig. 2 is a rear elevational view of the same.

The present embodiment of the invention comprises an axle tube 150 bolted to the trailer springs 151 as shown at 152 and has brackets 153 at its opposite ends, each formed of a single piece of metal having a portion 154 extending laterally of the axle 150 and provided with an aperture 155 whereby each can be slid along the axle 150 to points determined by the width of the vehicle. After the brackets 153 are adjusted along the axle tube 150 to points adapting the axle to any desired width of trailer, they are welded to the axle 150 by annular welds indicated at 156. Each bracket 153 terminates in a wheel spindle 158 for supporting the trailer wheels 159 and the brake aprons 160. Rigidly mounted on the axle 150 intermediate the ends thereof is an inverted channel bracket 161 which has its edges arc welded to the axle and carries a pin 162 pivotally supporting a lever 163 intermediate its ends. One extreme end 164 of the lever 163 is pivotally connected to a longitudinally adjustable brake rod 165 extending through one of the brake aprons 160 for connection to the wheel brake mechanism not shown. Another adjustable brake rod 167 is similarly connected to the other wheel brake mechanism in the opposite trailer wheel and is pivoted to the lever 163, as indicated at 168, at a point short of the end 169 of the lever 163. The length of the brake rods 165 and 167 are adjusted by means of their adjustable connections 149 to the lever 163. Swinging movement of the lever 163 in both directions, is limited by stops secured to the bracket 161 on opposite sides of the lever, as shown in Fig. 1.

A power cylinder 170 is pivotally carried by the axle 150 by means of a rod 171 pivotally attached to the cylinder 170 and to a U-shaped bracket 172 rigidly secured to the axle 150. Reciprocally mounted in the power cylinder 170 is a piston 173 having a piston rod 174, the exposed end of which is pivotally connected to the lever 163 by connection with any one of the holes 175 in the lever 163. The hole 175 selected for the connection of the piston rod 174 depends upon the leverage desired to be applied to the brake rods 165 and 167 by the proper piston 173. The opposite sides of the piston 173 are normally exposed to atmosphere by means of a breather 180 at one end of the power cylinder and through a conduit 181 adapted to be connected to an operator controlled valve on a tractor, as for example the valve 25 having an atmospheric port 26 and a port connection 27 with the intake manifold, and which valve causes evacuation of the cylinder on one side of the piston 175 when the valve is moved to one position to apply the brakes on the tractor, and which opens this side of the piston to atmospheric pressure when moved to another position for releasing the tractor brakes.

Prior to installing this braking and axle unit in the trailer, the brackets 153 are welded to the axle tube 150 at the desired points, the aprons 160 mounted on the spindles 158, the wheel brakes are secured to the aprons 160, and the brake rods are connected to the wheel brake mechanism and to the lever 163 mounted on the axle 150 and are then adjusted lengthwise as the wheel brake mechanisms are brought to final adjustments. These assembled parts are then mounted as a unitary assembly on the trailer, and the trailer wheels are mounted on the spindles and the conduit 181 connected to the control valve. The entire mechanism being finally adjusted prior to assembly on the trailer, needs no further adjustment after the assembly has been mounted on the trailer.

In order to operate the trailer brakes the operator moves the control valve to brake applied position to connect the conduit 181 with a source of suction, for example, the tractor engine manifold, whereby the piston 173 is subjected to differential pressures and moves to the left as viewed in Fig. 1. This movement of the piston causes the lever 163 to rotate clockwise and pull the brake rods therewith to apply the trailer brakes. When it is desired to release the trailer brakes the operator manipulates the control valve on the tractor to connect the conduit 181 with atmosphere to suspend the piston 173 in air, whereby the usual springs in the wheel brakes effect return of the brake rods and piston to brake release position.

This embodiment is of particular advantage where the trailer bodies are constructed in one plant and the axles with the brakes attached are made in another plant, since the axle and wheel brake assembly can be shipped as a unit to the trailer plant and installed as a unit on the body of the trailer, and when the trailer wheels are mounted on the spindles, no factory brake adjustment need be made, the brakes being finally adjusted prior to assembly in the trailer.

It will be understood that various changes in the construction and arrangements of parts may be resorted to without departing from the scope of the appended claims.

I claim:

1. As an article of manufacture, a brake and axle assembly adapted to be installed as a unit in a vehicle, comprising a vehicle axle, wheel spindles having right angular arms adjustably mounted upon the axle prior to being welded to opposite ends of said axle, a brake apron supported on each spindle, a wheel brake device carried by each apron, a power cylinder having one end pivotally mounted on said axle, a piston in said cylinder and having a piston rod, a lever pivotally supported by said axle and connected to said piston rod, a pair of adjustable brake rods pivotally connected to said lever and each extending alongside said axle to one of said wheel brakes, said axle and the parts supported thereby being adapted to be installed as a unit in a vehicle.

2. In a vehicle brake system, an axle, a brake device disposed at opposite ends of said axle, a lever fulcrumed upon the top of the axle at substantially the middle thereof and having one end offset into the horizontal plane of the axle, a power cylinder pivotally connected to the axle to one side of the lever fulcrum and arranged in the same horizontal plane of the axle, a piston in said cylinder having a piston rod connected to one end of said lever, and a pair of brake members connected to the lever on opposite sides of the fulcrum and extending outwardly in opposite directions on opposite sides of the axle to connect with the brake devices at the ends of the axle.

3. In a vehicle brake system, an axle, a brake device disposed at opposite ends of said axle, a lever fulcrumed at substantially the middle of the axle, said lever having its power arm offset down into the horizontal plane of the axle, a power cylinder pivotally connected to the axle in the horizontal plane thereof to one side of the lever fulcrum, a piston in said cylinder having a piston rod connected to the power arm of said lever, and a pair of brake members connected to the lever on opposite sides of the fulcrum and extending outwardly in opposite directions to connect with the brake devices at the ends of the axle.

GERHARD C. R. KUIPER.